June 13, 1967 R. H. McDANIEL 3,325,726

BRIDGE TYPE VOLTAGE REGULATOR UTILIZING BACKWARD DIODES

Original Filed June 18, 1962 2 Sheets-Sheet 1

RONNIE H. McDANIEL
INVENTOR.

BY

ATTORNEY.

BRIDGE TYPE VOLTAGE REGULATOR UTILIZING BACKWARD DIODES

Original Filed June 18, 1962 2 Sheets-Sheet 2

RONNIE H. McDANIEL
INVENTOR.

BY [signature]

ATTORNEY.

United States Patent Office 3,325,726

Patented June 13, 1967

3,325,726

BRIDGE TYPE VOLTAGE REGULATOR UTILIZING BACKWARD DIODES

Ronnie H. McDaniel, La Verne, Calif., assignor to Hoffman Electronics Corporation, a corporation of California Continuation of application Ser. No. 203,134, June 18, 1962. This application Apr. 25, 1966, Ser. No. 549,766
8 Claims. (Cl. 323—75)

This application is a continuation of applicant's copending application Ser. No. 203,134, filed June 18, 1962, now abandoned.

The present invention relates to voltage regulators, and more particularly to voltage regulators able to supply a stable voltage at a very low level.

There is a need for a circuit able to provide a stable low voltage usable as a bias supply for devices such as tunnel-diode amplifiers and oscillators. In the case of linear tunel-diode parallel amplifier circuits, a low voltage bias source of less than 200 millivolts is needed. As a result of the non-linearity of the negative-resistance portion of the voltage-current characteristic of tunnel diodes, a small change in the amplifier D.C. operating point may cause a very large change in current gain, since the input impedance would then be much lower. Therefore, the bias source stability becomes a quite critical factor in tunnel diode amplifier circuits.

It is an object of the present invention, therefore, to provide a novel voltage regulator.

It is another object of the present invention to provide a voltage regulator able to supply a stable low voltage that can be used as a bias for a tunnel-diode amplifier.

According to one embodiment of the present invention, a voltage regulator comprises a bridge circuit in which each of three of its legs includes a resistor and the fourth leg includes a "backward" diode. The output taken across one pair of opposite points on the bridge will be constant in spite of large changes in the voltage of the supply battery connected across the opposite points of the bridge.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
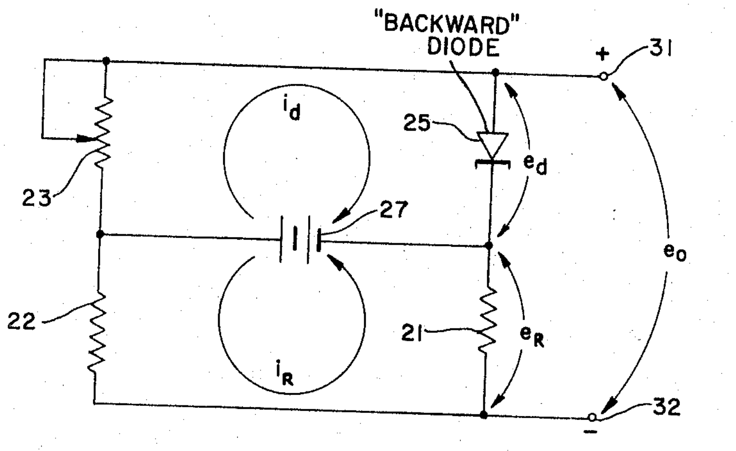
FIGURE 1 is a schematic diagram of a circuit according to the present invention.

Turning now to the drawings, FIGURE 1 shows resistors 21–23, and "backward" diode 25 forming a bridge circuit with battery 27 connected from the junction between resistor 21 and "backward" diode 25 to the junction between resistor 22 and variable resistor 23. Output terminals 31 and 32 are electrically connected to the junction between resistor 23 and the anode of diode 25 and to the junction between resistors 21 and 22, respectively. Battery 27 is poled so that terminal 31 is positive with respect to terminal 32 with the example values for the resistors as discussed subsequently.

Figure 2:
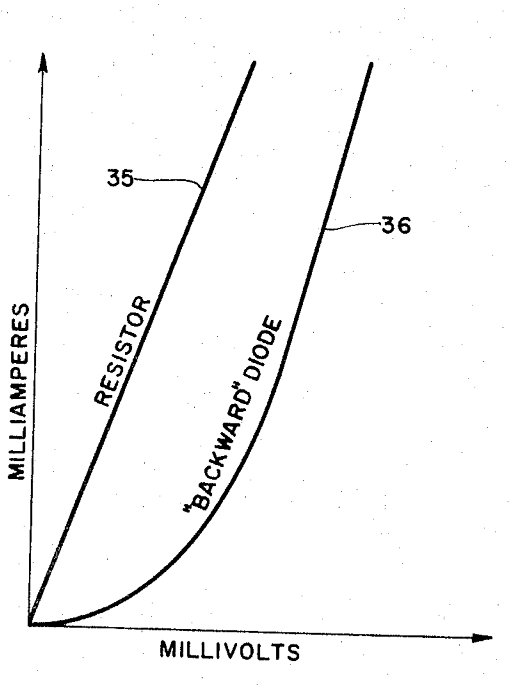
FIGURE 2 is a graph of the outputs present in the cricuit of FIGURE 1.

FIGURE 2 shows characteristic curve 35, representing the voltage, $e_R$, across resistor 21, and characteristic curve 36, representing the voltage $e_d$, across "backward" diode 25.

A "backward" diode utilizes the quantum mechanical tunneling effect to produce high forward conductance at low voltage levels. When biased in the reverse direction, a "backward" diode exhibits a leakage tunneling current of microampere magnitude. When used as a rectifier, a "backward" diode has a forward voltage drop many times smaller than that of a conventional diode, while maintaining high reverse impedance.

The "backward" diode is manufactured with a modified doping level, but is otherwise quite similar to a tunnel diode in fabrication procedures. The reverse voltage-current characteristic of the tunnel diode is synonymous with the forward characteristic of the "backward" diode. Except for significant differences in current levels, the reverse voltage-current characteristic of the "backward" diode is also synonymous with the forward characteristic of the tunnel diode, even to having a negative resistance characteristic. A "backward" diode is essentially a tunnel diode that has been doped so as to have a low peak current, $I_p$, and a low peak-to-valley ratio.

One of the most important characteristics of the "backward" diode is its high forward conductance at low voltage levels. In addition, the "backward" diode increases overall efficiency because of its low forward voltage drop, which introduces less loss.

The circuit of FIGURE 1 takes advantage of the fact that the volt-ampere characteristic curves of a resistor and a "backward" diode are very nearly parallel over a large range of current through the diode and resistor 21. Approximately the same amount of current flows through diode 25 and resistor 21, but in opposite directions, as indicated by $i_d$ and $i_R$, respectively. This results in an output voltage, $e_o$, which is the difference between the two voltages $e_d$ and $e_R$. For a given load resistance, the output voltage, $e_o$, will remain very close to its design value even though the output of battery 27 varies above or below its nominal value by a large percentage. That is, although the voltage supplied by battery 27 changes, which causes $e_d$ and $e_R$ to change, $e_o$ remains constant, since the difference between $e_d$ and $e_R$ remains constant.

This circuit permits the use of a battery having an output rating of more than one volt to supply a constant bias voltage of 80–200 millivolts to a circuit such as a tunnel-diode amplifier, which has an extremely critical bias requirement in the millivolt range. The bias network uses only four elements and a DC voltage source and is quite insensitive to temperature changes.

By way of example, the following components can be used in the circuit of FIGURE 1:

| | | |
|---|---|---|
| Battery **27** | volts | 3 |
| Resistor **21** | ohms | 10 |
| Resistor **22** | do | 300 |
| Resistor **23** | do | 270 |
| Diode **25** | | HU–100 (Hoffman) |

For the example given, as battery 27 varies 25% above and below 3 volts, $e_o$ will drop less than 2.5 millivolts, which is 2% of $e_o$.

Figure 3:
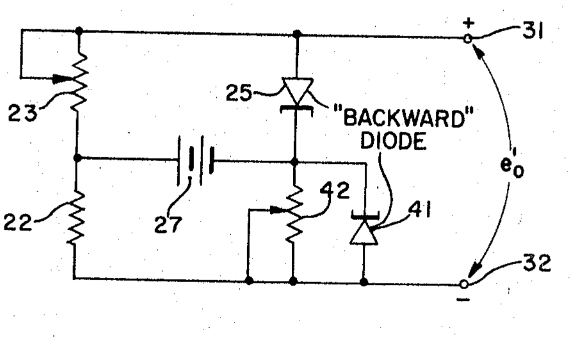
FIGURE 3 is a schematic diagram of a different embodiment of the present invention.

FIGURE 3 shows a circuit variation that can be used if a higher degree of regulation is desired. The only significant difference between the circuits of FIGURES 1 and 3 is that "backward" diode 41 is connected in parallel across variable resistor 42, which replaces resistor 21.

The operation of this modified circuit is similar to that of the circuit of FIGURE 1, except that the dynamic resistance of the parallel combination of diode 41 and resistor 42 closely matches the dynamic resistance of diode 25 over a much wider range of operations than did resistor 21 alone.

Figure 4:
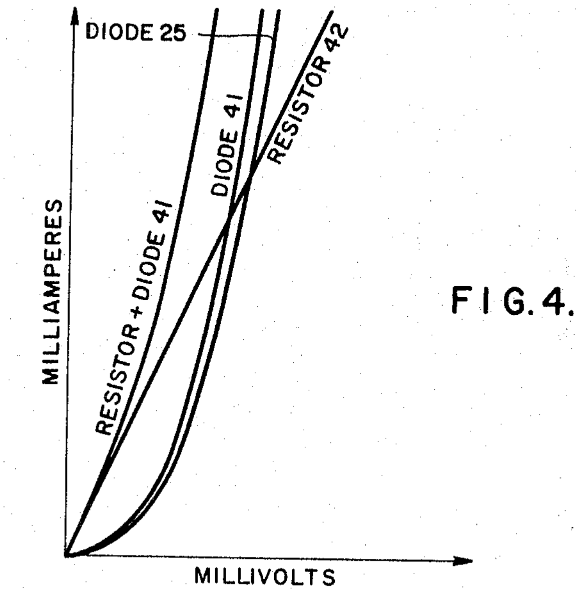
FIGURE 4 is a graph of the outputs present in the circuit of FIGURE 3.

FIGURE 4 is similar to FIGURE 2 and shows characteristic curves representing the voltage across diode 25, resistor 42, diode 41, and the parallel combination of resistor 42 and diode 41. It can be seen from FIGURE 4 that the composite voltage-current characteristic of the parallel combination is parallel to that of diode 25 over a very large range.

By way of example, the following components can be used in the circuit of FIGURE 3:

| | | |
|---|---|---|
| Battery **27** | volts | 3 |
| Resistor **22** | ohms | 150 |
| Resistor **23** | do | 135 |
| Resistor **42** | do | 12 |
| Diode **25** | | HU–100 |
| Diode **41** | | HU–100 |

For the preceding components, a variation of ±25% in the output voltage of battery 27 will cause a change in output voltage, $e_o'$, of no more than 0.4%. Output regulation will be maintained for larger battery supply voltages, but since diode 25 has a maximum forward conductance rating of about 50 milliamperes, the maximum battery voltage, V, for continuous duty is determined by the equation $$V_{(\max)}=I_dR+E_d$$

where $I_d$ is the maximum allowable diode current, $E_d$ is the diode voltage at that current, and R is the resistance of resistor 23. The battery voltage can be smaller or larger than 3 volts if the resistors are adjusted accordingly.

Figure 5:
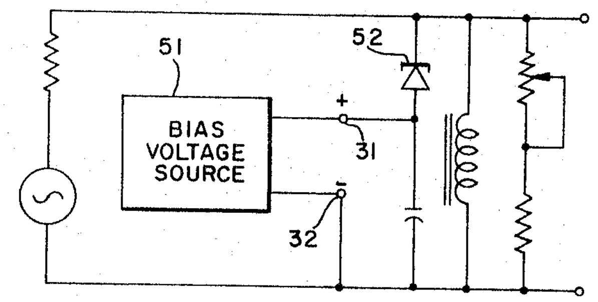
FIGURE 5 is a diagram of a tunnel-diode amplifier utilizing the present invention.

FIGURE 5 shows a typical tunnel-diode parallel amplifier. Bias voltage source 51 can be either the circuit of FIGURE 1 or 3 and shows how terminals 31 and 32 can be coupled to the amplifier circuit, with terminal 31 being connected to the anode of tunnel diode 52. The use of "backward" diodes to provide a very stable low-voltage bias supply makes the bias voltage independent of extreme input supply voltage changes, such as a decaying battery would present.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. A voltage regulator for providing a regulated DC output voltage at a pair of output terminals from an unregulated DC voltage source having positive and negative voltage terminals, the improvement comprising a diode exhibiting the quantum mechanical tunnelling effect and having a voltage-current characteristic in a first direction wherein current increases continuously as the applied voltage is increased and having a peak and valley voltage-current characteristic in a second direction as the applied voltage is increased, a first resistor coupled in series with said diode providing a first junction between said diode and said first resistance, said series combination of said first resistor and said diode being connected across said output terminals, second and third resistors coupled in series across said output terminals, and providing a second junction between said second and third resistors, and said first and second junctions respectively being connected to said negative and positive terminals with said D.C. voltage source biasing said diode solely in said first direction, said regulated output voltage being the difference in voltage drops across said diode and said first resistance.

2. A voltage regulator as in claim 1 including an additional diode having the same characteristics as said first named diode coupled in parallel with said first resistor, said additional diode being biased solely in said first direction by said D.C. voltage source.

3. A voltage regulator comprising a bridge circuit including first, second, third and fourth terminals, a first resistor coupled to said first and second terminals, a second resistor coupled to said second and third terminals, a third resistor coupled to said third and fourth terminals, a diode coupled between said fourth and first terminals, said diode exhibiting the quantum mechanical tunnelling effect and having a voltage-current characteristic in a first direction wherein current increases continuously as the applied voltage is increased and having a peak and valley voltage-current characteristic in a second direction as the applied voltage is increased, and a source of D.C. voltage coupled to said first and third terminals biasing said diode solely in said first direction, said second and fourth terminals providing a stable low level output voltage between approximately eighty and two hundred millivolts.

4. Apparatus as defined in claim 3 including a second diode having the same characteristics as said first named diode coupled in parallel with said first resistor, said second diode being biased solely in said first direction.

5. Apparatus as defined in claim 4 wherein the corresponding electrodes of said first named diode and said second diode are coupled to said first terminal, and said D.C. voltage source applying a negative voltage to said first terminal with respect to the voltage applied thereby to said third terminal.

6. A voltage regulator comprising a bridge circuit having first and second terminals respectively connected to the negative and positive terminals of a D.C. voltage source, said bridge circuit including first and second current paths connected in parallel and having the ends thereof respectively connected to said first and second terminals, said first current path including a diode exhibiting the quantum mechanical tunnelling effect and having a voltage-current characteristic in a first direction wherein current increases continuously as the applied voltage is increased and having a peak and valley voltage-current characteristic in a second direction as the applied voltage is increased, said diode being connected in series with a resistance and being biased by said voltage source solely in said first direction, and said second current path including at least two resistances connected in series.

7. A voltage regulator as in claim 6 wherein one of said resistances in said second current path has a lead connected to said first terminal, and a diode having the same characteristics as said first named diode is connected in parallel with said one resistance in said second current path and is biased solely in said first direction by said voltage source.

8. An amplifier comprising tunnel-diode amplifier means including a tunnel-diode for amplifying an input signal applied to said amplifier means, a bias voltage source coupled with said tunnel diode amplifier means for supplying a stable low level bias voltage thereto within a range of approximately eighty to two hundred millivolts including, first, second, third and fourth terminals, a first resistor coupled to said first and second terminals, a second resistor coupled to said second and third terminals, a third resistor coupled to said third and fourth terminals, a first diode coupled to said first and fourth terminals, said diode exhibiting the quantum mechanical tunnelling effect and having a voltage-current characteristic in a first direction wherein current increases continuously as the applied voltage is increased and having a peak and valley voltage-current characteristic in a second direction as the applied voltage is increased, a source of D.C. voltage coupled to said first and third terminals, said diode being biased by said source of D.C. voltage solely in said first direction, and a second diode having the same characteristics as said first diode coupled in parallel with said first resistor and being biased by said source of D.C. voltage solely in said first direction, said second and fourth terminals of said bias voltage source being respectively coupled to first and second output terminals, said output terminals being coupled with said tunnel diode amplifier means with said second output terminal being coupled to the anode of said tunnel diode.

References Cited

UNITED STATES PATENTS

| | | | |
|---|---|---|---|
| 2,881,382 | 4/1959 | Amato | 323—75 |
| 3,065,636 | 11/1962 | Pfann | 307—88.5 |
| 3,194,983 | 7/1965 | Sear | 307—88.5 |

OTHER REFERENCES

"Electronic Industries," September 1960, page 231.

G.E. Tunnel Diode Manual, March 1961, TK-7872-S4-G4, page 9.

JOHN F. COUCH, *Primary Examiner.*

A. D. PELLINEN, *Assistant Examiner.*